United States Patent
Mönch

(10) Patent No.: US 7,425,932 B2
(45) Date of Patent: Sep. 16, 2008

(54) PROJECTION SYSTEM FEATURING LIGHT SOURCE LUMINUOUS FLUX SENSING AND COMPENSATION

(75) Inventor: Holger Mönch, Vaals (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 454 days.

(21) Appl. No.: 10/521,257

(22) PCT Filed: Jul. 11, 2003

(86) PCT No.: PCT/IB03/03176

§ 371 (c)(1), (2), (4) Date: Jan. 13, 2005

(87) PCT Pub. No.: WO2004/010710

PCT Pub. Date: Jan. 29, 2004

(65) Prior Publication Data

US 2006/0097958 A1 May 11, 2006

(30) Foreign Application Priority Data

Jul. 18, 2002 (DE) ................ 102 32 501

(51) Int. Cl.
G09G 5/00 (2006.01)
(52) U.S. Cl. ............... 345/7; 353/81
(58) Field of Classification Search ........ 345/7, 345/87, 88, 589; 348/E9.027, 771, 115; 353/22, 353/37, 50, 77, 81; 349/5, 7, 8, 11; 315/149; 359/443, 449

See application file for complete search history.

(56) References Cited

U.S. PATENT DOCUMENTS 5,706,061 A * 1/1998 Marshall et al. ............ 348/743

(Continued)

FOREIGN PATENT DOCUMENTS

DE 29914555 U1 10/1999

(Continued)

OTHER PUBLICATIONS

Shimizu "Scrolling Color LCOS for HDTV Rear Projection" in SID 01 Digest of Technical Papers, vol. XXXII, pp. 1072 to 1075, 2001.

(Continued)

*Primary Examiner*—Chanh Nguyen
*Assistant Examiner*—Pegeman Karimi

(57) ABSTRACT

A projection system having a projection display (20), at least one light source (10), and a sensor means for sensing and compensating for changes in the luminous flux emitted by the at least one light source (10) is described. The sensor means comprises in this case at least one sensor arrangement (30; 31, 32; 33, 34) for sensing components (M) of the light from the light source (10) that are directed into a region surrounding an entering face of an optical component (11) of the projection system. It has been found that there is a very good correlation between these components (M) of the light from the light source (10) and those other components (I) of the light that actually reach the projection display (20), which means that by controlling a power supply unit (10c) for the light source (10) and/or a driver unit (20a) driving the projection display (20) in a suitable manner it is possible very effectively to suppress fluctuations in brightness that occur as a result of, for example, unstable arc discharges.

9 Claims, 3 Drawing Sheets

U.S. PATENT DOCUMENTS

| | | | |
|---|---|---|---|
| 6,188,427 B1 * | 2/2001 | Anderson et al. | 347/255 |
| 2003/0020412 A1 * | 1/2003 | Luerkens et al. | 315/149 |
| 2003/0179192 A1 * | 9/2003 | Allen et al. | 345/207 |
| 2003/0227465 A1 * | 12/2003 | Morgan et al. | 345/589 |

FOREIGN PATENT DOCUMENTS

| | | | |
|---|---|---|---|
| EP | 1280387 A2 | | 1/2003 |
| EP | 1280387 B1 | | 1/2003 |
| WO | WO 94/10675 | * | 5/1994 |
| WO | WO9410675 A1 | | 5/1994 |

OTHER PUBLICATIONS

Dewald, Penn, Davis "Sequential Color Recapture and Dynamic Filtering: A Method of Scrolling Color" in SID 01 Digest of Technical Papers, vol. XXXII, pp. 1076 to 1079, 2001.

* cited by examiner

PROJECTION SYSTEM FEATURING LIGHT SOURCE LUMINUOUS FLUX SENSING AND COMPENSATION

The invention relates to a projection system having a projection display, at least one light source, and a sensor means for sensing and compensating for changes in the luminous flux emitted by the at least one light source.

What are used as light sources in projection systems are generally one or more high-pressure gas-discharge lamps (high intensity discharge (HID) or ultra high performance (UHP) lamps). In principle, lamps of this kind can be operated both with direct current and with alternating current. There are advantages and disadvantages to both modes of operation. Whereas with an alternating current it is possible to prevent any rapid erosion of the electrodes and to improve the efficiency of the lamp, the arc discharge is often unstable due to the change in polarity and cyclic fluctuations in brightness or other faults with the projected image may therefore occur. However, even with a lamp operated with direct current it cannot be ruled out that, particularly towards the end of its life, there may be instabilities in the arc discharge due, for example, to the gap between the electrodes having by then become too large.

To ensure an image of optimum and fault-free quality throughout the entire life of a discharge lamp, sensors should therefore be provided in both these modes of operation to monitor the luminous flux emitted and to compensate as appropriate for short-term fluctuations and any long-term decline.

Fluctuations of the above kind are a particular nuisance when they appear on projection displays employing sequential color recapture (single panel displays). Displays of this type include, for example, LCOS displays, where the three primary colors pass over the screen sequentially in the form of colored bars (see in this connection Shimizu "Scrolling Color LCOS for HDTV Rear Projection" in SID 01 Digest of Technical Papers, Vol. XXXII, pages 1072 to 1075, 2001), and SCR-DMD projection displays (see in this connection Dewald, Penn, Davis "Sequential Color Recapture and Dynamic Filtering: A Method of Scrolling Color" in SID 01 Digest of Technical Papers, Vol. XXXII, pages 1076 to 1079, 2001).

To generate light of the three primary colors, systems of this kind have a color modulator arranged between the light source and the display that is capable of causing considerable fluctuations in brightness in the system. This gives rise to the problem that the sensors mentioned above must not sense such fluctuations. In fact, what the sensors should do is to generate a signal that, ideally, is proportional to the luminous flux that, after optical integration, is incident on the display as a mean over time. However, since the optical integration and the color modulation are closely adjacent to one another in the above projection systems and are correlated with one another, it is relatively difficult to find a suitable position for the sensors in which they will be able to sense the said luminous flux without any problems.

Even in black-and-white projection systems, a luminous flux that varies cyclically or that declines during the life of the lamp may give rise to faults with the image or at least may be undesirable.

It is an object of the invention to provide a projection system of the kind specified above in the first paragraph above in which any adverse effects on the quality of the image caused by an unintentional change in the luminous flux emitted by the light source are at least largely avoided.

It is in particular an aim of the invention to provide a projection system that has at least one high-pressure gas-discharge lamp, in which any adverse effects on the quality of the image caused by fluctuations in the luminous flux, such fluctuations being due in particular to an unstable arc discharge, are at least largely avoided.

Finally, it is also an object of the invention to provide a projection system employing sequential color recapture, in which color artifacts due to an unintentional change in the luminous flux emitted by the light source are at least largely avoided, particularly when one or more high-pressure gas-discharge lamps operated by alternating current are used as a light source.

With respect to one embodiment, the object is achieved with a projection system having a projection display, at least one light source, and a sensor means for sensing and compensating for changes in the luminous flux emitted by the at least one light source, which means has at least one sensor arrangement for sensing components of the light from the light source that are directed into a region surrounding an entering face of an optical component of the projection system.

A particular advantage of this solution is that it is relatively easy to find a suitable position for the sensor arrangement in the projection system in which the said components of the light can be sensed.

Surprisingly, it has also been found that there is a high correlation between these components of the light and those other components that are used to actually produce the image. What this means is that the usual range of fluctuation in the brightness of the image that may be caused by, for example, an unstable arc discharge and that may be up to approximately 10%, can be reduced to a range of fluctuation of approximately 1%, which can then be considered no longer visible.

The advantageous embodiments discussed herein allow the fluctuations in the luminous flux that are sensed by the sensor arrangement to be compensated for relatively easily.

Preferred embodiments of the sensor arrangement enable the components of the light to be sensed with particular freedom from disruption. Another embodiment relates to an optical component around whose entering face the sensor arrangement is preferably positioned.

Finally, yet another embodiment defines a projection system that is particularly suitable for use with the sensor means according to the invention.

These and other aspects of the invention are apparent from and will be elucidated with reference to the embodiments described hereinafter.

The invention will be described below by reference to a projection system having an SCR-DMD (sequential color recapture—digital micro mirror) display. The design and operation of a projection system of this kind are described in detail in the article by Dewald, Penn, Davis entitled "Sequential Color Recapture and Dynamic Filtering: A Method of Scrolling Color" in SID 01 Digest of Technical Papers, Vol. XXXII, pages 1076 to 1079, 2001. This article is incorporated by reference in the present description.

Figure 1:
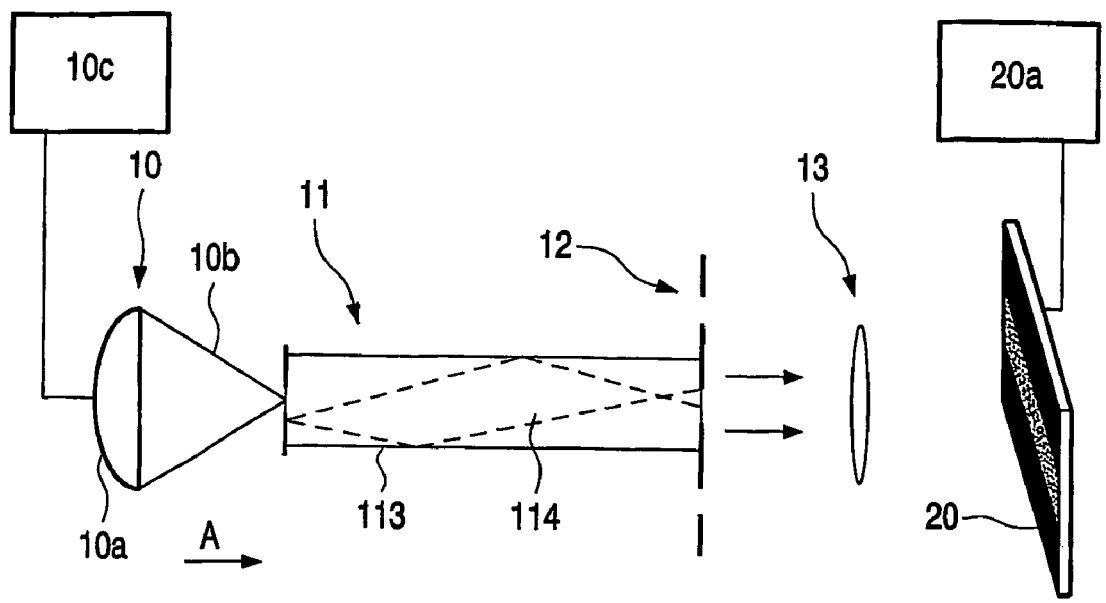
FIG. 1 is a side-view showing the general arrangement of a color projection system.

FIG. 1 shows the general arrangement of the illuminating section of a projection system of this kind. What are shown in this case are a light source 10 having a reflector 10a, together with essential optical components, namely a rod integrator (light resonator) 11, a color wheel 12, a relay lens (projection lens) 13 and a DMD display 20 that is driven by a driver means 20a.

The light source 10 comprises one or more high-pressure gas-discharge lamps, and one or more reflectors 10a by which a cone of light 10b is directed onto an entering face of the rod integrator 11. A power supply unit 10c is used to power the light source 10.

Figure 2:
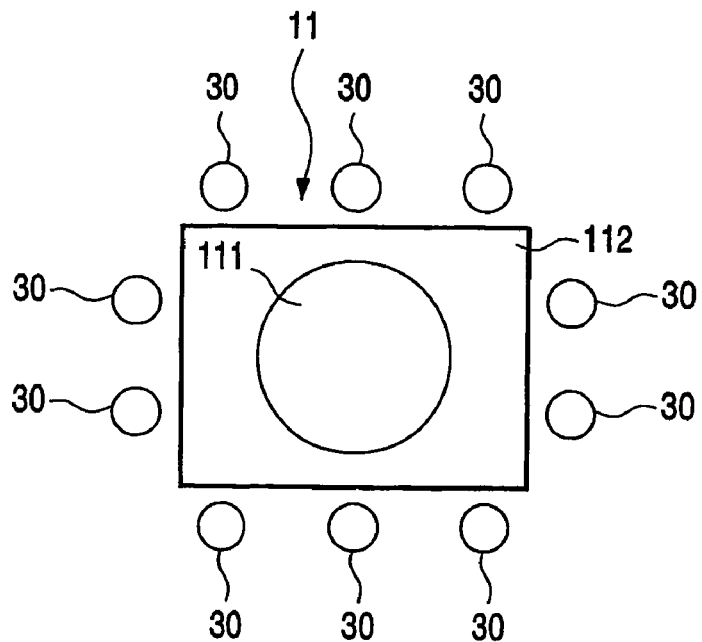
FIG. 2 is a view of a first embodiment looking in the direction of arrow A in FIG. 1.

FIG. 2 is an end elevation of the entering face looking in the direction of arrow A in FIG. 1. The entering face is made up of a central, transparent, substantially circular, first region 111 and a second, mirrored region 112, surrounding the first region 111, whose area is approximately two thirds of the total area of the entering face.

The size of the entering face is so selected that the efficiency with which light is projected is optimum. It generally depends on the extent of the lamp and of the entire arrangement.

The rod integrator 11 comprises a highly reflective shell 113 of glass that encloses a light guide 114. This light guide may be formed by a cavity or by a suitable light-conducting material. The light that is coupled into the light guide 114 is reflected a plurality of times at the shell 113 and, if the rod integrator 11 is sufficiently long, is homogenized, thus giving the light a substantially uniformly distributed intensity at the emergent face of the integrator 11.

The color wheel 12 (color modulator) has transparent red, green and blue coatings that each reflect dichroically and that are laid out in the form of an RGB pattern of Archimedean spirals. The pattern is so sized that at any given time one or more colored spirals cover the cross-sectional area of the emergent face of the integrator. A property that the pattern has is that the boundaries between the colors red, green and blue are moved at constant speed in the radial direction when the color wheel 12 is turned. As a result, the RGB pattern moves across the emergent face of the rod integrator at a speed that is close to constant. The distance between the emergent face of the rod integrator 11 and the color wheel 12 should be kept as small as possible to avoid light losses.

The RGB pattern is finally projected onto the DMD display 20 by the relay lens 13. When the color wheel 20 rotates, this RGB pattern moves continuously over the DMD display 20.

In the course of this, the two color components that are not being allowed to pass through at the time by the relevant coating on the color wheel 12 (e.g. two thirds of the illuminated area) are reflected back into the rod integrator 11 and are further homogenized there by multiple reflection. On reaching the entering face of the rod integrator 11, one third of the light intensity leaves the rod integrator 11 in the direction of the light source 10, whereas two thirds of the light intensity is reflected at the mirrored second region 112 and is conveyed back to the emergent face by multiple reflection. These processes are repeated a number of times until all the light that entered the entering face of the rod integrator 11 from the light source 10 has made its way to the color wheel 12, or has been absorbed, or has left the rod integrator 11 again through the first region 111 of the entering face.

The light L emitted by the light source 10 is thus made up of a first component I that enters the rod integrator 11 through the transparent first region 111 of the entering face, a second component R that is reflected at the mirrored second region 112 of the entering face, and a third component M that fails to impinge on the entering face and instead is absorbed by the surroundings of the entering face, which are generally black. The equation that applies is thus:

$$L = I + R + M.$$

If the focal plane of the light source 10, which is situated at the entering face of the rod integrator 11, then changes or shifts, because for example the arc discharge of the discharge lamp concerned is unstable, the relative proportions of the three components I, R and M of the light change too.

Figure 3:
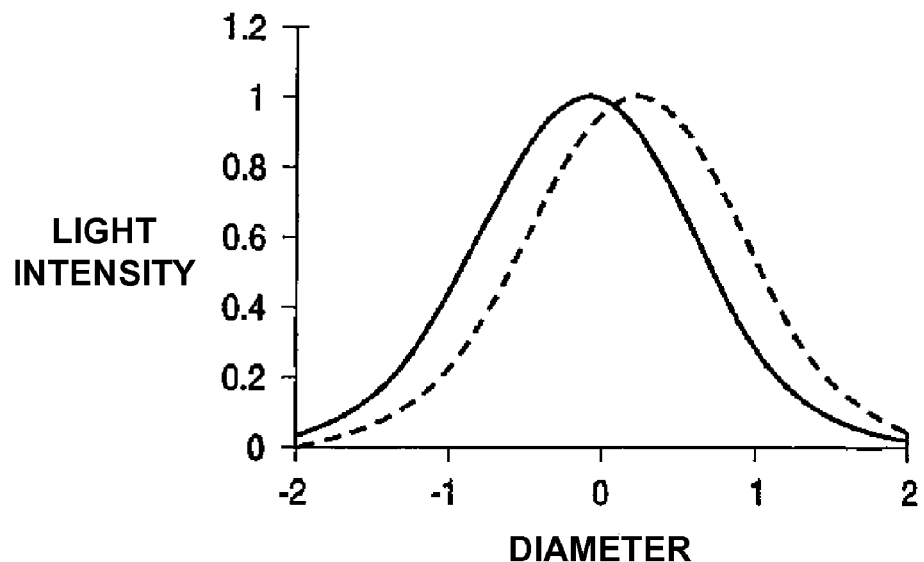
FIG. 3 shows different curves for light intensity in the focal plane of a lamp.

This is the situation that is illustrated in FIG. 3. Light intensity is plotted along the vertical axis whereas the horizontal axis is taken across a diameter of the entering face of the rod integrator 11. The central, transparent, first region 111 of the entering face lies approximately between the values −0.6 and +0.6 while the mirrored second region 112 connects up with the first region 111 and extends from those points to the outer circumference of the entering face at values of −1 and +1.

The solid line is a curve for the intensity of light in the (normal) case where the focal plane of the light source 10 is focused on the center of the entering face of the rod integrator 11. If, on the other hand, the arc discharge between the electrodes of the discharge lamp jumps to a different position due to instabilities, there is a change in the focal plane too and it thus assumes, for example, the displaced position indicated by the broken line in FIG. 3.

The reduction that this causes in the first component I of the light that enters through the transparent first region 111 of the entering face of the rod integrator 11 has to be sensed and compensated for to prevent any fluctuations in the brightness of the image.

It has proved to be impossible or not worthwhile for the first component I of the light to be sensed directly, due to the multiple reflections in the rod integrator 11 and the effect that the color wheel 12 has on it. Surprisingly however, it has been found that the third component M of the light, which components fails to impinge on the entering face of the rod integrator 11 and instead is directed into the regions surrounding the entering face, shows a sufficiently high correlation with the first component I of the light.

Figure 4:
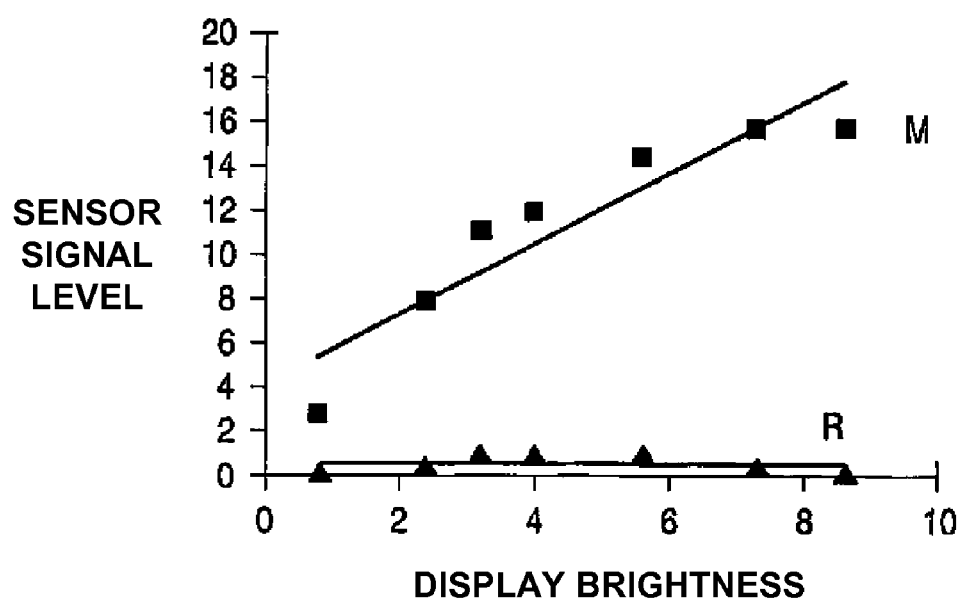
FIG. 4 shows different correlations between the changes in sensor signals and actual changes in intensity.

FIG. 4 shows the relationships in question in a graph in which the level of a sensor signal is plotted along the vertical axis and a brightness produced on the display by the first component I of the light is plotted along the horizontal axis. The Figure shows that the signal from a sensor sensing the second component R of the light hardly changes at all if there is a change in the first component I of the light, whereas there is virtually linear relationship between a change in the first component I of the light and the change in the signal from a sensor sensing the third component M of the light.

It has also been found that this latter linear relationship continues to apply even when it is only part of the third component M of the light that is sensed.

To enable this third component M of the light to be sensed, there is provided, as shown in FIG. 2, a sensor arrangement in the form or a plurality of individual sensors 30 that are arranged along the circumference of the rod integrator 11, preferably in the region of its entering face, and that are directed at the light source 10.

To obtain as linear as possible a relationship between the change in the first component I of the light and the signal from the sensors that sense the third component M of the light, the said third component M should be sensed along the entire circumference of the rod integrator 11 with weightings that are as equal as possible. As shown in FIG. 2, the sensors 30 are therefore arranged along the circumference as uniformly as possible.

Figure 5:
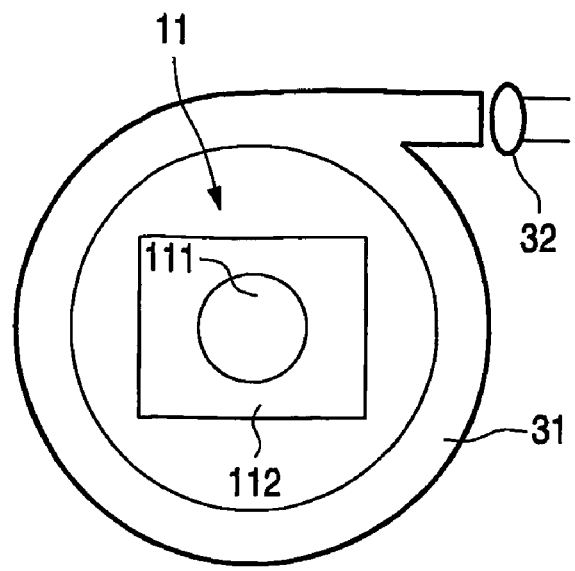
FIG. 5 is a view of a second embodiment looking in the direction of arrow A in FIG. 1.

As an alternative to the above, there may be arranged along the circumference of the rod integrator 11 not a plurality of individual sensors 30 but, as shown in FIG. 5, a light-guiding structure 31 that is formed, for example, from a slightly opaque plastics material. Part of the light that is incident on this structure 31 will be scattered into the structure and will travel on along it at the directing angle of total reflection until it encounters a sensor 32 to enable its intensity to be sensed. The sensor 32 is generally situated within the structure 31 in this case and is shown separate therefrom in FIG. 5 simply for greater clarity. The opacity of the material from which the structure 31 is formed is so selected as to produce a sensitivity that is uniform around the circumference of the rod integrator 11.

Figure 6:
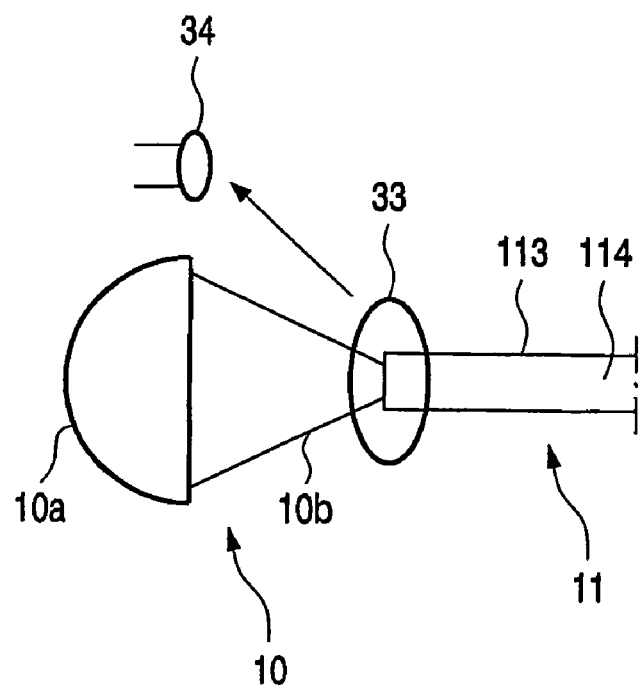
FIG. 6 is a side-view of a third embodiment.

Finally, FIG. 6 is a side-view similar to FIG. 1 of a third embodiment. In this view too can be seen the light source 10 having the reflector 10a, together with the rod integrator 11 that is formed by the highly reflective shell 113 and the light guide 114 enclosed by the latter. The light source 10 once again directs a cone of light 10b onto the entering face of the rod integrator 11.

To allow the third component M of the light to be sensed, there is provided a (Lambert) scattering surface 33, that is positioned around the entering face of the rod integrator 11 in place of the light-guiding structure 31 shown in FIG. 5, and a sensor 34 that is arranged laterally of the light source 10 and considerably outside the cone of light 10b.

The scattering surface 33 may, in particular, take the form of a ring having a white surface and may be so arranged that it surrounds the entering face of the rod integrator 11 and thus scatters at least part of the third component M of the light back onto the sensor 34. The signal from the sensor is proportional in this case to the amount of light incident on the scattering ring and hence to the size of the third component M of the light.

The second component R of the light, which component is produced by the light reflected back from the second region 112 of the entering face, remains within the cone of light 10b from the light source, as also does any light that makes a renewed exit from the first region 111 of the entering face, and because of this no further steps need be taken to screen off the sensor 34.

However, for thermal reasons, the sensor 34 should not be mounted too close to the light source 10. As far as possible, the outer area of the mirrored second region 112 of the rod integrator 11 may also be given a black coating.

In the view shown in FIG. 6, it can also be seen that different regions of the scattering surface 33 are situated at different distances from the sensor 34. To give all the regions of the scattering surface 33 an equal sensitivity to the third component M of the light that is independent of the particular distance at which they are situated, the scattering characteristic of the surface 33 is preferably arranged to differ as a function of this distance. This may, for example, be achieved by making the regions further away from the sensor 34 greater in width. Alternatively and/or in addition thereto, the thickness of a scattering colored coating may be sized to vary as appropriate.

The size of the first component I of the light that enters the rod integrator 11, which is what is wanted, can be found by linear interpolation from the level of the third component M of the light that is sensed by the sensor or sensors 30, 32, 34, by using the following equation:

$$I = -(M-b)/a.$$

The constants a and b for the relevant optical set-up have to be determined by experiment and can be used for all projection systems employing this set-up. The constants depend on, for example, the nature of the reflective second region 112 of the entering face, the size and shape of the rod integrator 11 and the size of the scattering or retro-reflecting area surrounding the rod integrator 11.

The minus sign in the equation expresses the fact that a reduction in the first component I of the light produces an increase in its third component M.

Finally, it has also been found that, for the range of fluctuation of approximately 10% that is actually realistic for the first component I of the light, the error shown by the change that is calculated from the above equation is less than approximately 1%. So small an error can be accepted for any kind of projection system because a change in intensity of 1% is not visible and, to be realistic, changes in the first component I of the light of more than 10% do not occur. Hence, with the projection system according to the invention, it is possible for instabilities in the arc discharge that lead to fluctuations in the brightness of the image to be suppressed in a ratio of at least 10:1.

As well as the sensor arrangements 30; 31, 32; 33, 34 for sensing the third component M of the light that are described above, the sensor means also preferably has a circuit (not shown) by which the fluctuations in the luminous flux emitted by the light source 10 are compensated for by using the signals from the sensors. For this purpose, the circuit is so arranged that it controls the driver means 20a for the projection display 20 to correct the brightness of the gray steps and/or the power supply unit 10c of the at least one light source 10 to correct the luminous flux emitted, doing so in such a way that that brightness of the image is corrected in a suitable way and the fluctuations are compensated for in this way.

Alternatively, the driver means 20a and/or the power supply unit 10c may of course also be so arranged that the sensors 30; 32; 34 can be connected directly thereto.

In the case of the above embodiments, it was assumed that there is in the reflector 10a a discharge lamp, the tips of whose electrodes are spaced apart substantially along the longitudinal axis of the reflector, that is to say in the direction in which the light is radiated. Hence, the arc discharge too extends substantially in this direction and any jumping of the arc perpendicularly thereto produces the shift in the curve defining the intensity of light at the entering face of the rod integrator that is shown in FIG. 3.

The principle according to the invention may, however, also be applied when the electrode tips are spaced apart in a direction perpendicular to the longitudinal axis of the reflector and the arc discharge too thus extends substantially in this direction. This may, for example, be achieved by positioning the electrode tips in a suitable way in the lamp or by mounting the lamp in the reflector 10a in a position that is rotated through 90°.

When this is the case, an unstable arc discharge may lead to the arc also jumping along the longitudinal axis of the reflector. This will result in turn not in the sideways lateral shift in light intensity that is shown in FIG. 3 but in de-focusing, which will flatten and spread out the shape of the solid-line curve shown in FIG. 3. Since this will generally increase the intensity of the light incident on the sensor arrangement according to the invention, fluctuations will be sensed in this case too and will be compensated for controlling the display and/or the power supply unit of the lamp in the manner described above.

The same will also be true if a decline in the luminous flux emitted by the lamp, due for example to age, has to be compensated for. A decline of this kind will make the solid curve shown in FIG. 3 shallower and narrower by a proportional amount and there will thus also be a decline in the intensity of the light incident on the sensor arrangement. Such a decline can, once again, be compensated for by controlling the display and/or the power supply unit of the lamp.

Sensing both of fluctuations and also of any longer-term decline in light is also possible by filtering of the signals from the sensor, which filtering is, where required, suitably time-based.

If, finally, the intention is also to compensate for a long-term decline of this kind in the luminous flux emitted by the lamp when the electrode tips are spaced apart along the longitudinal axis of the reflector in the manner first described above, the first embodiment shown in FIG. 2, where there are a plurality of individual sensors arranged along the circumference of the entering face of the rod integrator, is suitable for this purpose.

By analyzing the signals from individual sensors, it will then be possible for the case shown in FIG. 3 (jumping of the arc), in which a greater intensity of light is incident on some sensors and a lesser intensity of light is incident on those situated opposite, to be distinguished from the case in which, due to the emission of a reduced amount of light by the lamp, all the sensors are exposed to a correspondingly lower intensity of light. The compensating actions described may thus be taken in these cases too.

The invention claimed is:

1. A projection system comprising:
    a projection display;
    at least one light source; and
    a sensor means for sensing and compensating for changes in the luminous flux emitted by the at least one light source, wherein the at least one light source is configured to have a focal plane situated at an entering face of a rod integrator of the projection system, the rod integrator being positioned in between the at least one light source and the projection display, wherein the focal plane of the at least one light source is subject to change or shift due to instabilities of the at least one light source, wherein light emitted from the at least one light source comprises first and second spatial components (I) and (R) at the entering face which impinge on (i) a central transparent first region and (ii) a second mirrored region, surrounding the first region, respectively, of the entering face of the rod integrator and wherein the light emitted from the at least one light source further comprises a third spatial component (M) which fails to impinge on the entering face and instead is directed (iii) into a region immediately surrounding the entering face, and wherein the sensor means comprises a sensor arrangement configured in a region of the entering face to sense, along a circumference of the rod integrator with weightings that are as equal as possible, the third spatial component of the light from the light source that is directed into the region immediately surrounding the entering face.

2. A projection system as claimed in claim 1, further comprising a driver means for driving the projection display, wherein the driver means is controlled by the sensor arrangement to compensate for fluctuations in the luminous flux.

3. A projection system as claimed in claim 1, further comprising a power supply unit of the at least one light source, wherein the power supply unit is controlled by the sensor arrangement to compensate for the fluctuations in the luminous flux.

4. A projection system as claimed in claim 1, wherein the sensor arrangement comprises a plurality of sensors arranged proximate the entering face and along the circumference of the rod integrator and wherein the plurality of sensors are directed at the light source.

5. A projection system as claimed in claim 1, wherein the sensor arrangement comprises an optical waveguide structure, proximate to and surrounding the entering face of the rod integrator, to couple in incident light corresponding to the third spatial component of light from the light source, and at least one sensor to sense the third spatial component of light that is coupled in.

6. A projection system as claimed in claim 1, wherein the sensor arrangement comprises a surface, proximate to and surrounding the entering face of the rod integrator, to scatter incident light corresponding to the third spatial component of light coming from the light source, and a sensor to sense the third spatial component of light that is scattered.

7. A projection system as claimed in claim 6, wherein the sensor is arranged substantially next to the light source in a direction perpendicular to the direction of propagation of the light produced by the light source.

8. A projection system as claimed in claim 1, wherein the rod integrator is further configured for homogenizing the first and second spatial components of light produced by the light source which impinge on the entering face of the rod integrator.

9. A projection system as claimed in claim 1, further comprising a color display for sequential color representation and, as a light source, at least one high-pressure gas-discharge lamp operated by alternating current.

* * * * *